March 11, 1930.   E. B. CARNS   1,749,757
METAL FUSELAGE OR BODY
Filed March 5, 1927
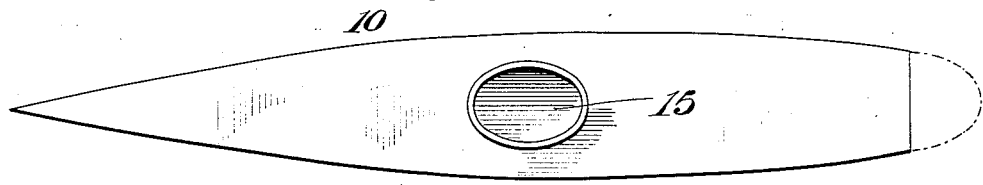
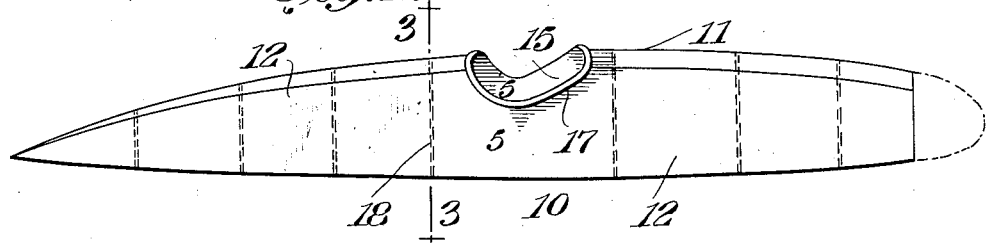
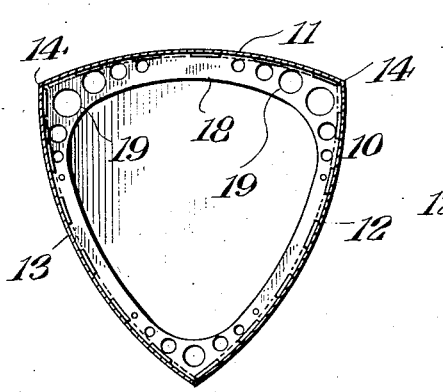
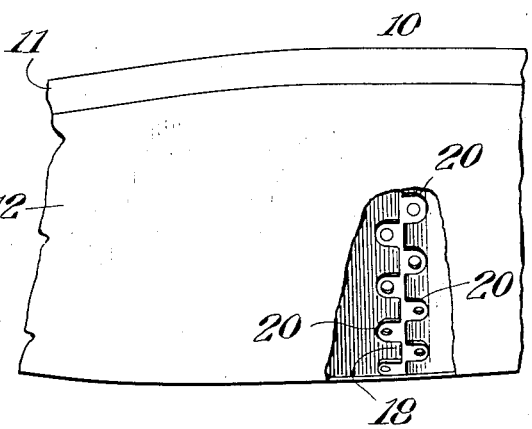
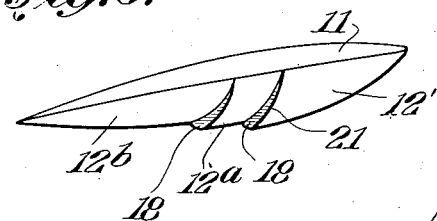
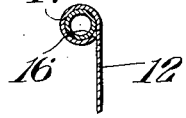
Inventor,
Edmund B. Carns.
By his Attorney.
Ramsay Hoguet.

Patented Mar. 11, 1930

1,749,757

UNITED STATES PATENT OFFICE

EDMUND BURKE CARNS, OF NEW YORK, N. Y., ASSIGNOR TO CAIRNS DEVELOPMENT COMPANY, OF WILMINGTON, DELAWARE, A CORPORATION OF DELAWARE

METAL FUSELAGE OR BODY

Application filed March 5, 1927. Serial No. 173,086.

My invention relates to improvements in bodies and is primarily intended as a metal monocoque fuselage for aircraft up to a certain size.

The object of my invention is to produce a light strong body, particularly adapted as a fuselage for an aircraft but which can also be used as a body for hydroplanes, speed boats or the like. My invention is intended to produce in a practical manner a fuselage or body of this character which is essentially triangular in cross-section, tapered to the desired extent, and capable of being economically made.

In producing this ideal shape for a fuselage or body having a triangular effect in cross-section and preferably crowning or bulging sides and tapering to the ends, I preferably employ three sheets of metal which are strong by reason of their shape and which, when united at the edges, will produce the above defined desirable body shape. Up to a certain size this result can be attained by shaping the three sheets with compound curves, so that they will bulge slightly and curve to produce the tapering shape. When these are united each side acts as a brace for the other. Moreover the fastenings at the meeting edges act to stiffen the body and in the nature of longérons at the corners so that in a body of moderate size internal bracing can if desired be dispensed with and the body will still be sufficiently strong. In such a structure, I also can employ a special type of bulkhead and the bulkheads can be transversely disposed in the body so as to receive entering stresses from the wings, landing carriage, or from other effects.

In such a structure, the necessary openings, as for example a cockpit opening, can be made and the strength lost by producing the opening can be compensated for by reinforcing the edge of the opening, for example, by introducing a stiffening member of the contour of the opening and folding or bending the plate or plates of the fuselage or body over the said stiffening member.

My invention is intended to produce a structure of the kind defined in such a way that the parts can be rolled, pressed or stamped, so as to render economical quantity production possible.

The invention, process of manufacture and advantages will appear more clearly from the description which follows.

Reference is to be had to the accompanying drawings forming a part of this specification, in which similar reference characters indicate corresponding parts in all the views.

Fig. 1 is a plan view of a fuselage embodying my invention.

Fig. 2 is a side elevation slightly in perspective of the same.

Fig. 3 is a cross-section on the line 3—3 of Fig. 2.

Fig. 4 is a broken enlarged side elevation showing the bulkhead arrangement.

Fig. 5 is a detail cross-section on the line 5—5 of Fig. 2, illustrating the reinforcing of a body opening; and Fig. 6 is a diagrammatic view on a reduced scale showing the adaptation of the principle of my invention to the construction of the boat bodies or the like.

The fuselage or body 10 is of generally triangular shape in cross-section and is preferably made up of three sheets 11, 12 and 13, which can be of sheet metal and which are rolled or shaped so as to be slightly crowning or curved as this gives the most desirable line to the fuselage or body and also increases the strength of the structure. These sheets are united at the edges as shown at 14 in any suitable manner, as for example by welding electrically or otherwise, or by riveting, or in fact any good commercial practice. By making the three sheets of compound curves, that is, curved laterally and longitudinally, the desired lines of the body are conserved and by fastening the sheets together at the edges the structure is thereby additionally braced.

By having each sheet formed or shaped to compound curvature, I mean that the sheet has the fore and aft and transverse shape described produced therein, as for example, in the manner disclosed in my application for Letters Patent of the United States, Ser. No. 174,454, filed March 11, 1927 in which case this compound curved shape is inherent and permanent in the sheet so that the fibres thereof are under tension and the sheet assumes this shape as its normal shape and can then simply be applied to form its part of the desired structure. The compound curve, therefore, is not like a sheet which is curved in one dimension and then forcibly fastened to a somewhat similar shape as in this case the shape is not inherent. An example of a permanent shape of this kind can be had in the bowl of an ordinary spoon. When I give to these several sheets this shape and it is made in a way like the example given in my prior application, the sheet is permanently of the compound curved shape and therefore is easy to apply and is great in its resistance to deformation. When three of these sheets are arranged, as shown, to form the fuselage in triangular arrangement and with their edges together, it will be seen that we get not only the individual side strength but that the sheets brace each other, thus making the internal bracing of the structure more or less negligible.

The invention is not limited to outwardly curved sheets as they may be inwardly curved, if desired. The cross sectional shape of the body thus formed is sometimes termed a circular triangle because each side represents a segment of a circle.

Where openings are necessary in the body as, for example, the cockpit 15, the weakening of the plate or plates by said opening is compensated for by reinforcing the edge of the opening. A light strong way of accomplishing this result is by having a tubular stiffening member 16 of the contour of the opening and folding or bending the adjacent plate or sheet of the fuselage or body over and around such tubular member, as shown at 17 in Fig. 5, and fastening the tubular member and plate together by welding or otherwise.

To stiffen the body and give it the desired rigidity bulkheads 18 are used which are of the cross-sectional contour of the fuselage and these are preferably of sheet material, which can be perforated as shown at 19 to give them the necessary lightness without materially weakening them and the bulkhead can, at its outer edge portion, be provided with lugs or ears 20 which are turned outward and shaped to fit snugly against the adjacent plate or sheet 11, 12 or 13, as the case may be, and the ears are riveted or otherwise secured to the adjacent sheet. Obviously, the bulkheads might be laminated, that is, two sheets for example might be placed back to back to form a backing with the ears or lugs, arranged as shown in Fig. 4, as above described.

It will be understood from the foregoing description that a fuselage or body up to a certain size can be economically made from the plan outlined, and that such a body will have ideal lines, will be economical and will possess remarkable rigidity in proportion to its weight.

This idea of shaping fuselages or bodies up to a certain limit can be carried out in connection with bodies of speed boats, hydroplanes or the like. For example in Fig. 6, I have shown a body in which the forward sides 12' are as indicated and the body is a step down toward the after part in the conventional way, and to accomplish this result the side plates or sheets can be cut transversely for the first step as shown at 21, then the succeeding section 12$^a$ can be pinched in and the step or opening between the forward section and the mid-ship section, as illustrated, closed by a bulkhead 18. The next after section 12$^b$ is formed in the same way by cutting the side plates and pinching in the next succeeding section. Obviously, any desired number of steps may be produced in this way and the body, as a whole, can be shaped as already clearly described.

The ideal construction for my strong fuselages or bodies has been described but I wish it to be clearly understood that in some of these bodies the sides can be concave or dishing instead of convex or crowning, without affecting the principle of the invention, and for some purposes this inward curving, representing as it does compound curves, is desirable.

In the claims I use the term fuselage but it will be understood that the structure designed as and termed a fuselage can be used as a hull or other analogous body.

I claim:

1. A fuselage for aircraft, substantially triangular in cross section and made of three preformed sides, each side having a convex curvature from one end to the other and having a continuous convex transverse curvature at all points along its length, whereby each side is longitudinally and transversely arched, such arched assembly of the three sides being substantially rigid in all dimensions.

2. An elongated body, adapted for use as a fuselage for aircraft, substantially triangular in cross section and made of three preformed sides, each side having a convex curvature from one end to the other and having a continuous convex transverse curvature at all points along its length, whereby each side is longitudinally and transversely arched, such arched assembly of the three sides being substantially rigid in all dimensions and means connecting the longitudinal marginal portions of the sides.

3. An elongated metal body, adapted for use as a fuselage for aircraft, substantially triangular in cross section and made of three preformed sides, each side being preformed convexly at all points longitudinally and convexly at all points transversely of the fuselage whereby each side is longitudinally and transversely arched, the sides being overlapped at the edges and secured together along the overlap, such overlapped portions forming longitudinally extending stiffening ribs.

In testimony whereof, I have signed my name to this specification this 4th day of March, 1927.

EDMUND B. CARNS.